United States Patent [19]
Roe et al.

[11] Patent Number: 5,929,655
[45] Date of Patent: Jul. 27, 1999

[54] DUAL-PURPOSE I/O CIRCUIT IN A COMBINED LINK/PHY INTEGRATED CIRCUIT

[75] Inventors: David Glen Roe, San Jose; Poucheng Wang, Mountain View, both of Calif.

[73] Assignee: Adaptec, Inc., Milpitas, Calif.

[21] Appl. No.: 08/824,203

[22] Filed: Mar. 25, 1997

[51] Int. Cl.[6] .............................................. A03K 19/0175
[52] U.S. Cl. .............................................. 326/82; 826/86
[58] Field of Search ................................. 326/82, 83, 86, 326/37, 49, 50, 90

*Primary Examiner*—Michael Tokar
*Assistant Examiner*—Don Phu Le
*Attorney, Agent, or Firm*—Martine Penilla & Kim LLP

[57] ABSTRACT

A dual-purpose I/O circuit for use in an integrated circuit having a primary circuit is provided. The dual-purpose I/O circuit includes two conducting pads, two single-ended I/O cells and one differential I/O cell. Several dual-purpose I/O circuits can be used within a single integrated circuit to support both single-ended and/or differential mode I/O signaling between external circuits and devices and a primary circuit within the integrated circuit. Within each dual-purpose I/O circuit, a first single-ended I/O cells is connected to a first conducting pad, a second single-ended I/O cell is connected to the second conducting pad and a differential I/O cell is connected to the both the first single-ended and second single-ended I/O cells and to both the first and second conducting pads. A control logic is connected to at least one of the first single-ended, second single-ended and differential I/O cells. The control logic is arranged to selectively enable and disable at least one of the first single-ended, second single-ended and differential I/O cells. The primary circuit can include any digital and/or analog circuit. The primary circuit can include a combined LINK/PHY circuit configured to support IEEE-1394 standard buses and communications.

29 Claims, 4 Drawing Sheets

DUAL-PURPOSE I/O CIRCUIT IN A COMBINED LINK/PHY INTEGRATED CIRCUIT

BACKGROUND

This invention relates generally to the design and manufacture of integrated circuits, and more particularly to the design and manufacture of input/output (I/O) circuits within the integrated circuit.

A typical integrated circuit (IC) includes a circuit die upon which a plurality of circuit components are provided to form a primary circuit and a plurality of dedicated input, output, or input/output (I/O) circuits. The I/O circuits can be used to input and output I/O signals, such as control, address and data signals. A typical I/O circuit includes an I/O cell and a conducting pad. The conducting pad is usually a bonding pad that can, for example, be coupled to an I/O pin with a bonding wire during manufacture.

As is known to those skilled in the art, there are usually only a limited number of I/O circuits and I/O pins that can be efficiently supported for a given die or package size. Thus, if the number of required I/O signals exceeds the number of available I/O circuits or pins that are available for a specific die or package size, the die and/or package will typically need to be increased in size to accommodate the additional I/O requirements. Increasing the size of the die, however, tends to increase the costs associated with manufacture of the IC, and can lead to "wasted" space on the die and unused I/O pins in the package. Furthermore, additional space may be required for the resulting larger IC within an intended system circuit, e.g., a printed circuit board.

Alternatively, when additional I/O circuits are required, the area on the die allocated to the primary circuit can be reduced thereby providing additional space for the additional I/O circuits. However, this solution can also lead to wasted space on the die as a result of common design/layout practices which usually call for placing a the I/O circuits in rows around or near the outer edges of the die, and the primary circuit, in a more or less rectangular or square area, near the center of the die.

Another potential solution is to separate a desired circuit into two or more portions and to design separate integrated circuits for each portion. While this can have its advantages, such as allowing for modular designs or specialized processes, it also tends to increase the number of components and space required in the final system. Moreover, this can result in higher manufacturing costs.

Consider, for example, FIG. 1a which is a block diagram illustrating a typical interface 10 that includes several integrated circuits each having one or more I/O circuits therein. These integrated circuits and the lines connecting each of them represent a portion of a data network, such as one that interconnects and provides data communication services between a computer and other related devices.

As shown, interface 10 is a typical implementation of an IEEE-1394 standard bus. Implementations, such as this, are well known to those skilled in the art, and can, for example, be used to support data transfer rates of 100, 200, and 400 Mbits/second between a plurality of devices.

IEEE-1394 specification P1394 draft 8.0 Version 2, which is available from IEEE of Piscataway, N.J., and which is incorporated herein by reference, defines a three-layered transport system consisting of a physical layer, a link layer and a transaction layer. Basically, the physical layer provides the signals required by an IEEE-1394 bus, the link layer takes the raw data from the physical layer and formats it into recognizable data packets, and the transaction layer takes the data packets from the link layer and presents them to an application.

As is known in the art, it is common to implement some of these different layers in separate, dedicated integrated circuits because of their unique functions, circuits, and I/O requirements. For example, the physical layer, which usually includes analog transceivers for sending and receiving I/O signals over the 4 (or greater) wires associated with the IEEE-1394 bus, can be implemented in a physical layer chip, or "PHY chip". In addition to sending and receiving I/O signals, a typical PHY chip can also perform system initialization, bus arbitration, and the associated handshaking required to transmit data in a over the bus. An example of a PHY chip is the IBM 21S750PFB available from International Business Machines (IBM) Corporation of White Plains, N.Y.

A "LINK chip", which is usually a digital logic circuit, is essentially the hardware implementation of the link layer. A LINK chip can also implement portions of the transaction layer, as well. A typical LINK chip basically provides isochronous (e.g., voice and video) data transfers, and forms, transmits and receives formatted data packets. An example of a typical LINK chip is the TI F643950 available from Texas Instruments Incorporated, of Dallas, Tex.

Referring to FIG. 1a, interface 10 includes a logic circuit 12, a LINK chip 14, a PHY chip 16, and an IEEE-1394 bus 18. Logic circuit 12 can, for example, represent the interface circuitry within a device such as a computer, a scanner, a printer, a disc controller, tape drive, or other like device that sends and receives various data in the form of I/O signals over bus 18.

As shown, LINK chip 14 is coupled to exchange I/O signals with logic circuit 12 over lines 20, and with PHY chip 16 over lines 22. PHY chip 16 is coupled to exchange I/O signals with LINK chip 14 over lines 22, and with external circuits or devices (not shown) over bus 18. The external circuits or devices can, for example, be similar to those represented by logic circuit 12 and can include the same or similar circuits as interface 10, as well.

One drawback with interface 10, however, is the high number of integrated chips required to provide an interface between logic circuit 12 and bus 18. In particular, for many applications it would be advantageous to combine LINK chip 14 and PHY chip 16 in a single integrated circuit. Unfortunately, this has not proven an easy task due to a number of different design issues. One of the design issues is the number and types of I/O circuits, and the space limitations for a given die. For example, unlike a LINK chip, a PHY chip typically includes I/O circuits that are dedicated for driving I/O signals over bus 18 in a differential mode. Thus, any similarly configured LINK/PHY chip hybrid, or combination, would therefore be required to provide this additional differential I/O capability.

FIG. 1b is a diagrammatic illustration of an integrated circuit 40 that has additional I/O circuits that are capable of supplying a given conducting pad with either a normal or a differential I/O signal. Integrated circuit 40 includes a die 40 having a primary circuit 44, and a plurality of I/O circuits 46 formed in different areas, thereon. As depicted, a subset 48 of the plurality of I/O circuits 46 are typically formed in a row along one or more sides of die 42. Each I/O circuit includes a conducting pad 50, a main I/O cell 52 and a secondary I/O cell 54. Main I/O cell 52 can, for example, include the components that function to transfer normal I/O signals between primary circuit 44 and the main I/O cell's associated conducting pad 50. Such I/O cells are well known in the art, and are commonly referred to as single-ended I/O cells. Secondary I/O cell 54 can, for example, include the components that function to transfer differential (as opposed to single-ended) I/O signals between primary circuit 44 and the secondary I/O cell's associated conducting pad 50. Such I/O cells are well known in the art, and are commonly referred to as differential I/O cells. Of course, depending upon the design, one or more of the main I/O cells could be differential I/O cells, and one or more of the secondary I/O cells could be single-ended I/O cells, as well.

Unfortunately, one drawback to adding the secondary I/O cells is that some of the secondary I/O cells may not be used by the final integrated circuit, or for that matter, even be provided with components during manufacture. For example, while there are I/O circuits within PHY chip 16 that are single-ended, and others that are differential, FIG. 1b also reflects that there are several "unused" secondary I/O cells 56 (i.e., having an "X" drawn through them). As a result of extending the length of I/O circuits (i.e., to create space for a secondary I/O cell) in one or more of the I/O circuits in a row, the amount of remaining space provided for primary circuit 44 will typically be reduced. Moreover, there is the possibility that some of the space consumed by the I/O circuit expansion, such as unused secondary I/O cells 56, will simply be wasted.

Therefore, what is desired are more efficient methods and apparatuses for providing I/O circuits for use with a combined LINK/PHY circuit on a single circuit die, wherein the I/O circuits are capable of supporting single-ended and differential I/O signaling modes without significantly reducing the available space on a circuit die for the combined LINK/PHY circuit.

SUMMARY

The present invention provides methods and apparatuses for providing dual-purpose I/O circuits for use with a combined LINK/PHY circuit on a single circuit die, wherein each of the dual-purpose I/O circuits can be configured to support either one, or both, single-ended and differential I/O signaling modes. Because of their reduced size, the dual-purpose I/O circuits can be implemented without significantly reducing the available space on a circuit die for the LINK/PHY circuit. The dual-purpose I/O circuits, in accordance with one aspect of the present invention, can be used for any integrated circuit that requires the inputting and outputting of signals.

In accordance with one embodiment of the present invention, there is provided a dual-purpose I/O circuit for use in an integrated circuit. The dual-purpose I/O circuit includes two conducting pads, two single-ended I/O cells and one differential I/O cell. Several dual-purpose I/O circuits can be used within a single integrated circuit to support both single-ended and/or differential mode I/O signaling between external circuits and devices and a primary circuit within the integrated circuit. The I/O signals can, for example, include control signals, address signals, and/or data signals.

Within each dual-purpose I/O circuit, a first single-ended I/O cells is connected to a first conducting pad, a second single-ended I/O cell is connected to a second conducting pad, and a differential I/O cell is connected to the both the first single-ended and second single-ended I/O cells, and to both the first and second conducting pads. A control logic is connected to at least one of the first single-ended, second single-ended and differential I/O cells. The control logic is arranged to selectively enable and disable at least one of the first single-ended, second single-ended and differential I/O cells.

In accordance with one implementation of the present invention, the control logic supplies one or more control signals that effectively configure the dual-purpose I/O circuit in an operating mode. Possible operating modes include a single-ended input mode, a single-ended output mode, a differential input mode, and a differential output mode. In the single-ended input mode the differential cell is disabled, and at least one of the single-ended I/O cells is enabled and configured to transfer I/O signals from one of the conducting pads to the primary circuit. Similarly, in the single-ended output mode the differential cell is disabled, and at least one of the single-ended I/O cells is enabled and configured to transfer I/O signals from the primary circuit to one of the conducting pads. In the differential input mode, both of the single-ended I/O cells are disabled and the differential I/O cell is enabled and configured to convert at least one differential I/O signal, as applied to one of the conducting pads, into a proportional logic I/O signal that is then transferred to the primary circuit. Similarly, in the differential output mode, both of the single-ended I/O cells are disabled and the differential I/O cell is enabled and configured to convert at least one I/O signal, as received from the primary circuit, into a proportional differential I/O signal that is then transferred to one or more of the conducting pads.

In accordance with yet another embodiment of the present invention, there is provided an integrated circuit die that includes a primary circuit, and at least one dual-purpose I/O circuit. The primary circuit can be arranged to supply one or more mode section signals that control the operating mode of the dual-purpose I/O circuit.

In accordance with an embodiment of the present invention, the primary circuit includes both a LINK circuit and a PHY circuit, wherein the LINK and PHY circuits are connected to one another and to one or more dual-purpose I/O circuits.

In accordance with still another embodiment of the present invention, there is provided a method for inputting/outputting I/O signals in an integrated circuit. The method includes providing a primary circuit within the integrated circuit, providing at least one or more dual-purpose I/O circuits within the integrated circuit, configuring the dual-purpose I/O cell with one or more control signals, and causing one or more I/O signals to be transferred to or from the primary circuit by way of at least one of the dual-purpose I/O circuits.

In accordance with another embodiment of the present invention, the is provided an integrated circuit having a circuit die. The circuit die having a first side that includes a primary logic circuit area, and a plurality of I/O cell areas. Wherein each of the I/O cell areas each has substantially the same width and length, and are arranged along an outside edge of the circuit die, and wherein two of the I/O cell areas are adjacent to one another and include a dual-purpose I/O circuit within their combined areas.

BRIEF DESCRIPTION OF THE DRAWINGS

The invention, together with further objects and advantages thereof, may best be understood by reference to the following description taken in conjunction with the accompanying drawings in which.

DESCRIPTION

Figure 1A:
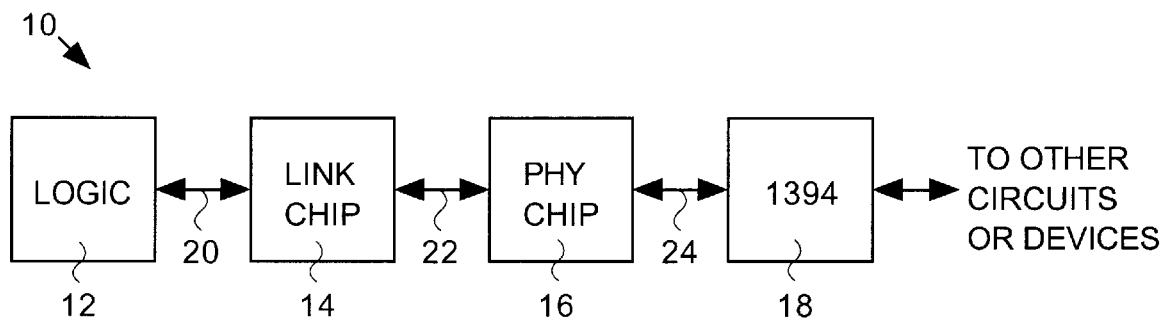
FIG. 1a is a block diagram illustrating a prior-art interface that implements a IEEE-1394 standard.
Figure 2A:
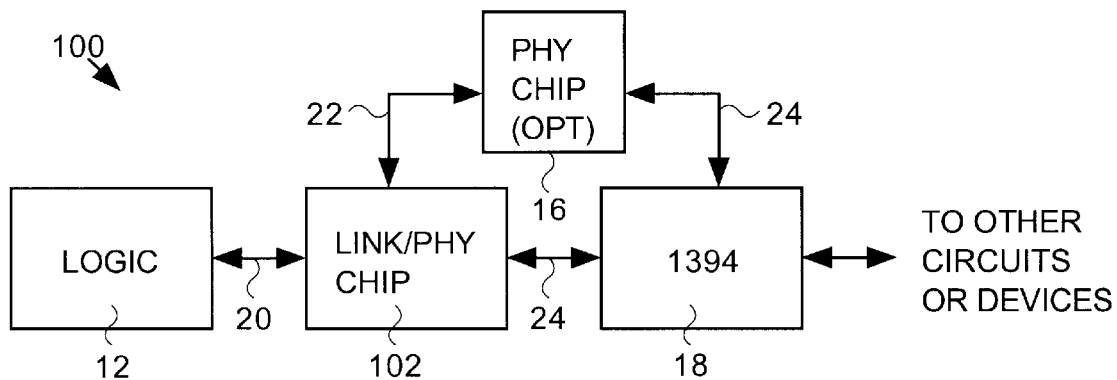
FIG. 2a is a block diagram illustrating an improved interface, that implements portions of a IEEE-1394 standard in a combined LINK/PHY chip, in accordance with one embodiment of the present invention.

FIG. 2a is a block diagram illustrating an improved interface 100, in accordance with one embodiment of the present invention, that implements the IEEE-1394 standard as discussed previously. Interface 100 includes a logic circuit 12, combined LINK/PHY chip 102, an optional PHY chip 16, and an IEEE-1394 bus 18 that can be connected to other similarly interfaced circuits or devices. As shown, LINK/PHY chip 102 can be configured to provide the functionality of both a LINK chip and a PHY chip (in which case PHY chip 16 is not required). As a result of combined LINK/PHY chip 102, the number of chips in the resulting chipset are reduced from two chips (as in FIG. 1a) to a single chip.

LINK/PHY chip 102, in accordance with one embodiment of the present invention, can also be configured, for example via control signals, to provide only the functionality of a LINK chip. By providing this optional configuration, LINK/PHY chip 102 is made more flexible in that it can be used in differently designed systems. For example, in designs where the electrical ground of the LINK and PHY circuits are likely to be different (e.g., at different potentials), the optional PHY chip 16 can be used to isolate the PHY circuit from the LINK circuit portions.

In order to provide this configuration capability and also to accommodate both the LINK and PHY circuits on a single integrated circuit die without having to greatly increase the size of the die or the number of I/O pins, a dual-purpose I/O circuit has been developed. The dual-purpose I/O circuit provides the capability to send and receive I/O signals in either a single-ended or differential mode. As will be discussed in greater detail below, the dual-purpose I/O circuit preferably includes two single-ended I/O cells, a differential cell, and two conducting pads. Moreover, a dual-purpose I/O circuit in accordance with one embodiment of the present invention can be designed to occupy about the same, or even less space, than that typically required for two single-ended I/O pads. This can be accomplished, for example, by creating a circuit in accordance with the present invention and taking advantage of the continued reduction in component sizes as provided by the latest I/C manufacturing processes.

Figure 2B:
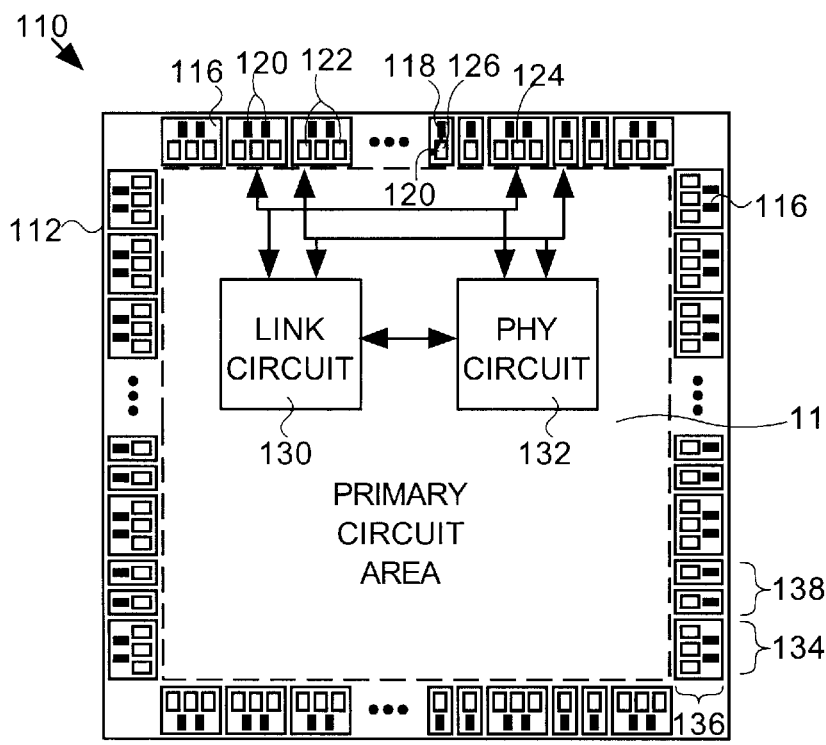
FIG. 2b is a diagrammatic illustration of a integrated circuit for use as the LINK/PHY chip in FIG. 2a having a dual-purpose I/O circuit, in accordance with one embodiment of the present invention.

FIG. 2b is a diagrammatic illustration of an integrated circuit 110 for use in implementing LINK/PHY chip 102, in accordance with one embodiment of the present invention. Integrated circuit 110 includes a die 112 having a primary circuit 114, a plurality of dual purpose I/O circuits 116, and a plurality of single-purpose I/O circuits 118, each of which are formed in different areas on die 112. As shown, the plurality of dual-purpose I/O circuits 116 and single-purpose I/O circuits 118 are positioned about a periphery of die 112 and about primary circuit 114.

Figure 1B:
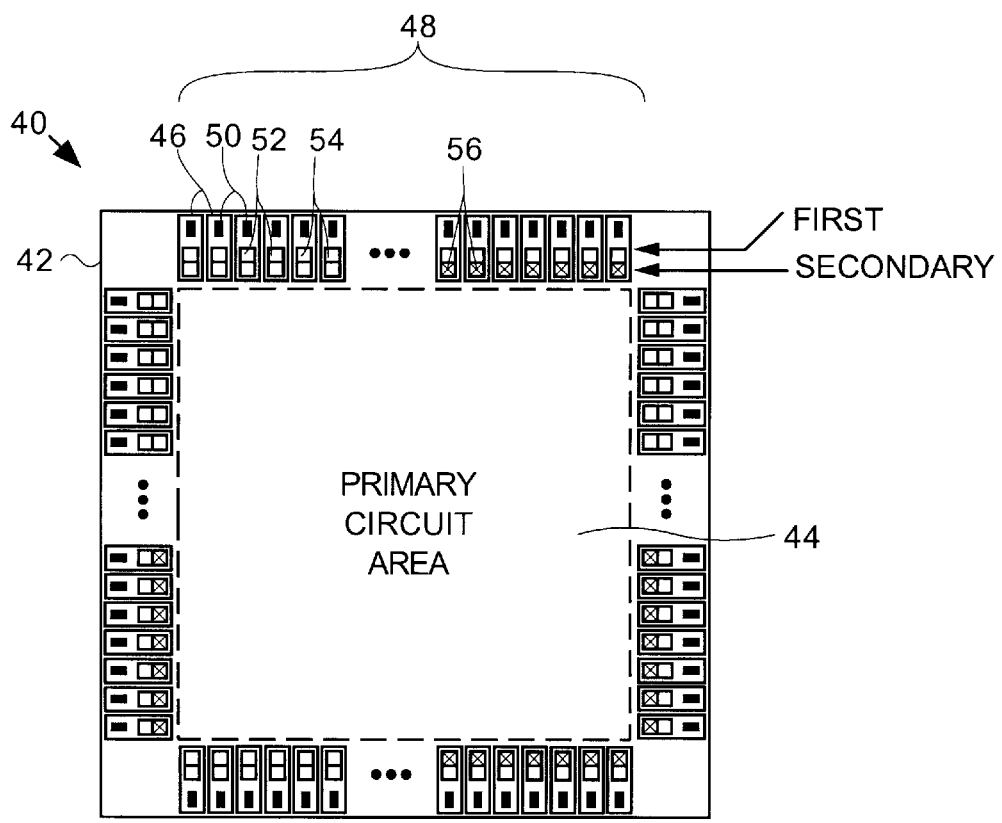
FIG. 1b is a diagrammatic illustration of a prior-art integrated circuit that has additional I/O cells.

Each dual-purpose I/O circuit 116 includes two conducting pads 120, two single-ended I/O cells 122 and a differential I/O cell 124. Single-purpose I/O circuits 118, which are optional, include a single conducting pad 120 and a mono-purpose I/O cell 126. As illustrated, and in accordance with one embodiment of the present invention, dual-purpose I/O cell 116 occupies the same space as two adjacent mono-purpose I/O circuits 118. In particular, attention is drawn to the dual-purpose I/O circuit 116 at the lower right-hand corner of the die marked as having a width 134 and a length 136. Also, illustrated nearby this dual-purpose I/O circuit 116 are two adjacent mono-purpose I/O circuits 118 which are shown as having a combined width 138 and an individual length 136. Notice that width 134 and combined width 138 are about equal and that length 136 is about equal to individual length 136. As a result, unlike integrated circuit 40 in FIG. 1b, the amount of space available for primary circuit 114 has not been decreased to make space for the additional I/O capabilities provided by the dual-purpose I/O circuits 116.

Primary circuit 114 can include any circuit that can be implemented within an integrated circuit. By way of example, primary circuit 114 can include digital logic circuitry as represented by LINK circuit 130 and analog circuitry as represented by PHY circuit 132. Several embodiments of both the LINK and PHY circuits, as discussed previously, are available and known to those skilled in the art. As shown, LINK circuit 130 and PHY circuit 132 are coupled to one another directly on the die in a similar configuration as if they were separate chips mounted, for example, on a circuit board. LINK circuit 130 and PHY circuit 132 are also coupled to a plurality of I/O circuits, such as dual-purpose I/O circuits 116 and optional mono-purpose I/O circuits 118, through which I/O signals can be exchanged with external circuits or devices. Primary circuit 114 can also include other digital logic, such as registers, memory cells, an the like, and can for example be a programmable logic array (PLA), or other similar implementation. Furthermore, the circuit die can be an application-specific integrated circuit (ASIC), or other like configuration, as well.

Figure 2C:
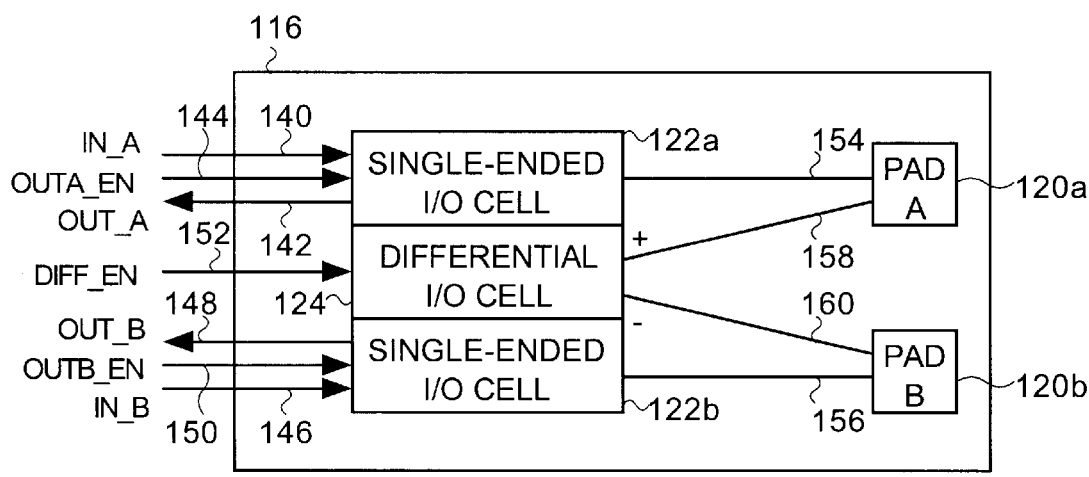
FIG. 2c is a block diagram of a dual-purpose I/O circuit as in FIG. 2b, in accordance with one embodiment of the present invention.

FIG. 2c is a block diagram of a dual-purpose I/O circuit 116, in accordance with one embodiment of the present invention, having a first conducting pad 120a, a second conducting pad 120b, a first single-ended I/O cell 122a, a second single-ended I/O cell 122b, and a differential I/O cell 124.

First single-ended I/O cell 122a is arranged to transfer a first I/O signal between first conducting pad 120a (via line 154), and an input line IN_A 140 and an output line OUT_A 142 which are coupled to primary circuit 114. First single-ended I/O cell 122a is also coupled to control signal line OUTA_EN 144 to receive an enable signal. This enable signal establishes the direction of the first I/O signal (i.e., input or output) in relationship to integrated circuit 110.

Similarly, second single-ended I/O cell 122b is arranged to transfer a second I/O signal between second conducting pad 120b (via line 156), and an input line IN_B 146 and an output line OUT_B 148 which are coupled to primary circuit 114. Second single-ended I/O cell 122b is further coupled to control signal line OUTB_EN 150 to receive an enable signal. This enable signal establishes the direction of the second I/O signal (i.e., input or output) in relationship to integrated circuit 110.

Differential I/O cell 124 is coupled to first single-ended I/O cell 122a, second single-ended I/O cell 122b, first conducting pad 120a (via line 158), and second conducting pad 120b (via line 160). Differential I/O cell 124 is further coupled to receive an enable signal over control signal line DIFF_EN 152 which enables and disables differential I/O cell 124. Although not depicted in FIG. 2c, differential I/O cell 124 also receives the enable signals from OUTA_EN 144 and OUTB_EN 150 which further establish the direction of one or more differential I/O signals (i.e., input or output) in relationship to integrated circuit 110.

When differential I/O cell 124 is enabled, dual-purpose I/O circuit 116 essentially acts as a differential I/O cell with respect to the I/O signals present on conducting pads 120a and 120b, lines IN_A 140, OUT_A 142, IN_B 146, and OUT_B 148. When differential I/O cell 124 is disabled, dual-purpose I/O circuit 116 essentially acts two separate single-ended I/O cells with respect to the I/O signals present on conducting pad 120a, lines IN_A 140 and OUT_A 142, and conducting pad 120b, lines IN_B 146 and OUT_B 148.

When acting as two separate single-ended I/O cells, dual-purpose I/O circuit 116 connects conducting pad 120a to lines IN_A 140 or OUT_A 142 depending on the configuration mode, i.e., input or output mode for the resulting single-ended I/O cell. Likewise, dual-purpose I/O circuit 116 further connects conducting pad 120b to lines IN_B 146 or OUT_B 148 again depending on the configuration mode, i.e., input or output mode for the resulting single-ended I/O cell.

As such, when differential I/O cell 124 is enabled and configured to input I/O signals from conducting pads 120a and 120b, differential I/O cell 124 will convert the differential signals as applied to pads 120a and 120b into two proportional digital logic signals that are then supplied to primary circuit 114 through lines OUT_A 142 and OUT_B 148, respectively. Similarly, when differential I/O cell 124 is enabled and configured to output I/O signals from lines IN_A 140 and IN_B 146 to conducting pads 120a and 120b, respectively, differential I/O cell 124 will convert the I/O signals from primary circuit 114 on lines IN_A 140 and IN_B 146, into proportional differential signals that are then applied to pads 120a and 120b, through lines 158 and 160, respectively. Notice that line 158 is marked as carrying a positive differential I/O signal and line 160 is marked as carrying a negative I/O differential signal, however these could of course be reversed depending upon the application.

There is embodied within the various I/O cells in dual-purpose I/O circuit 116 a control scheme and associated control logic that configures dual-purpose I/O circuit 116 to one of four operating modes in response to the control signals on lines OUTA_EN 144, OUTB_EN 150 and DIFF_EN 152. The four operating modes include, a single-ended input mode, a single-ended output mode, a differential input mode, and a differential output mode. Of course, it is recognized that dual-purpose I/O circuit 116 can be altered such that one or more of these operating modes is not applicable. By way of example, a dual-purpose input-only, or output-only, circuit can be created by disabling or leaving out certain components.

Figure 3:
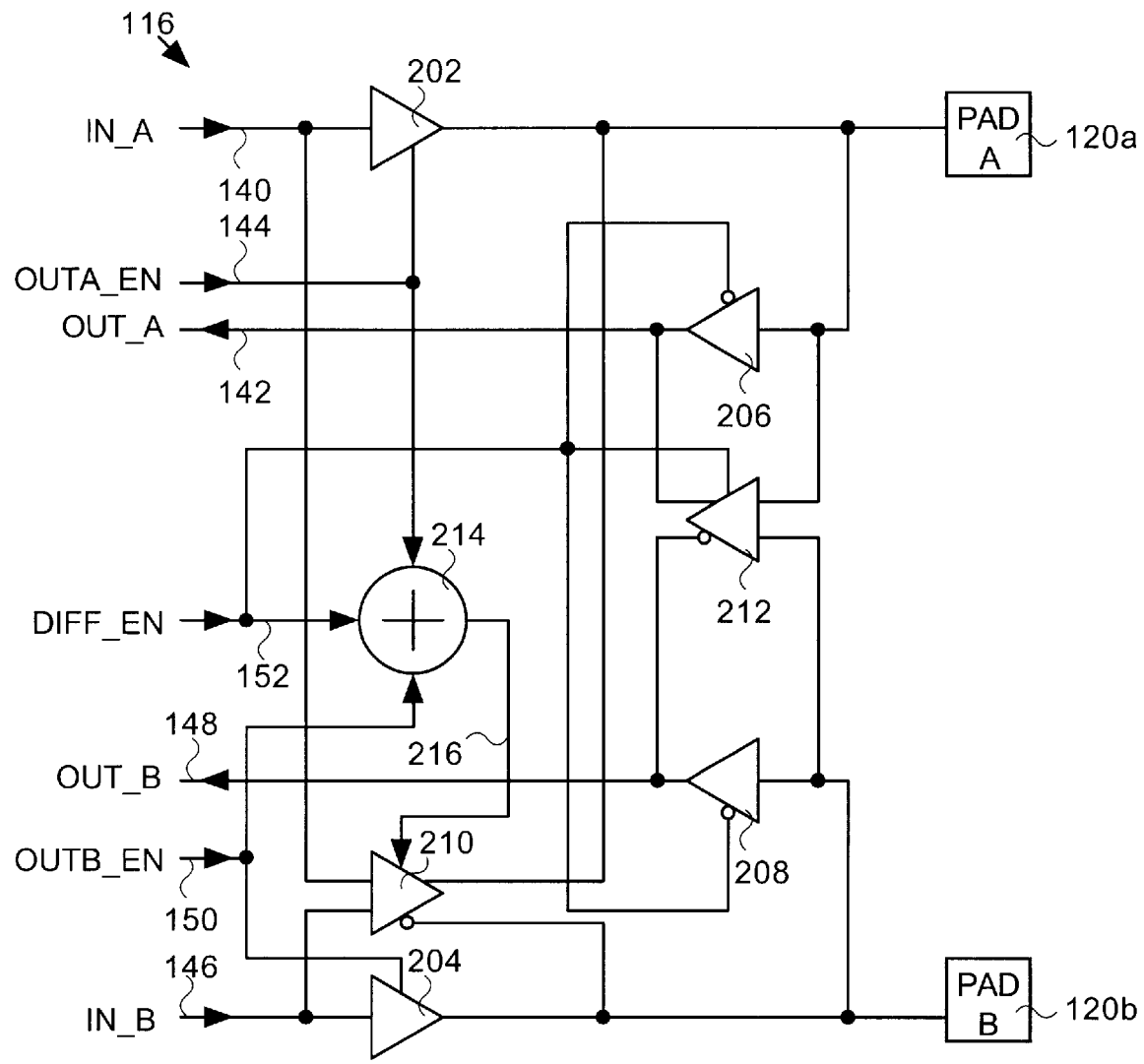
FIG. 3 is a block diagram of a dual-purpose I/O circuit as in FIGS. 2b and 2c, in accordance with one embodiment of the present invention.

FIG. 3 is a block diagram of a dual-purpose I/O circuit 116, in accordance with one embodiment of the present invention. As shown, dual-purpose I/O circuit 116 includes a first single-ended output buffer 202, a second single-ended output buffer 204, a first single-ended input buffer 206, a second single-ended input buffer 208, a differential output buffer 210, a differential input buffer 212, a summer 214, and conducting pads 120a and 120b.

First single-ended output buffer 202 is coupled to line IN_A 140 and outputs the I/O signal received therefrom to pad 120a when the enable signal on line OUTA_EN 144 is logical high. First single-ended output buffer 206 is coupled to pad 120a and outputs the I/O signal received therefrom to line OUT_A 142 when the enable signal on line DIFF_EN 144 is logical low.

Similarly, second single-ended output buffer 204 is coupled to line IN_B 146 and outputs the 1(0 signal received therefrom to pad 120b when the enable signal on line OUTB_EN 150 is logical high. Second single-ended output buffer 208 is coupled to pad 120b and outputs the 1(0 signal received therefrom to line OUT_B 148 when the enable signal on line DIFF_EN 144 is logical low.

Differential output buffer 210 is coupled to lines IN_A 140 and IN_B 146, and to summer 214. Differential output buffer 210 also receives a TP_bias voltage signal (not shown) that can be generated internally, or supplied to dual-purpose I/O circuit 116 by primary circuit 114. As is known to those skilled in the art, the TP_bias voltage signal is used as a reference point for the center voltage between the positive and negative differential I/O signal voltage swings. Differential output buffer 210 outputs differential signals based on the difference between the logical I/O signals on lines IN_A 140 and IN_B 146 to pads 120a and 120b. As shown, a positive differential I/O signal is applied to pad 120a, and a negative differential I/O signal is applied to pad 120b when summer 214 outputs a logical high on line 216.

Summer 214 is coupled to lines OUTA_EN 144, DIFF_EN 152 and OUTB_EN 150. As shown, summer 214 outputs a logical high on line 216 provided when lines OUTA_EN 144, DIFF_EN 152 and OUTB_EN 150 are all logical high. Likewise, summer 214 outputs a logical low on line 216 when any line, of lines OUTA_EN 144, DIFF_EN 152 and OUTB_EN 150, is logical low.

Differential input buffer 212 is coupled to pads 120a and 120b and line DIFF_EN 152. Differential input buffer 212 also receives a TP_bias voltage signal, discussed above. Differential input buffer 212 outputs logical I/O signals based on the difference between the differential I/O signals on pads 120a and 120b to lines OUT_142 and OUT_B 148, when line DIFF_EN 152 is logical high. As shown, a positive differential signal is received from pad 120a, and a negative differential is received from pad 120b.

Figure 4:
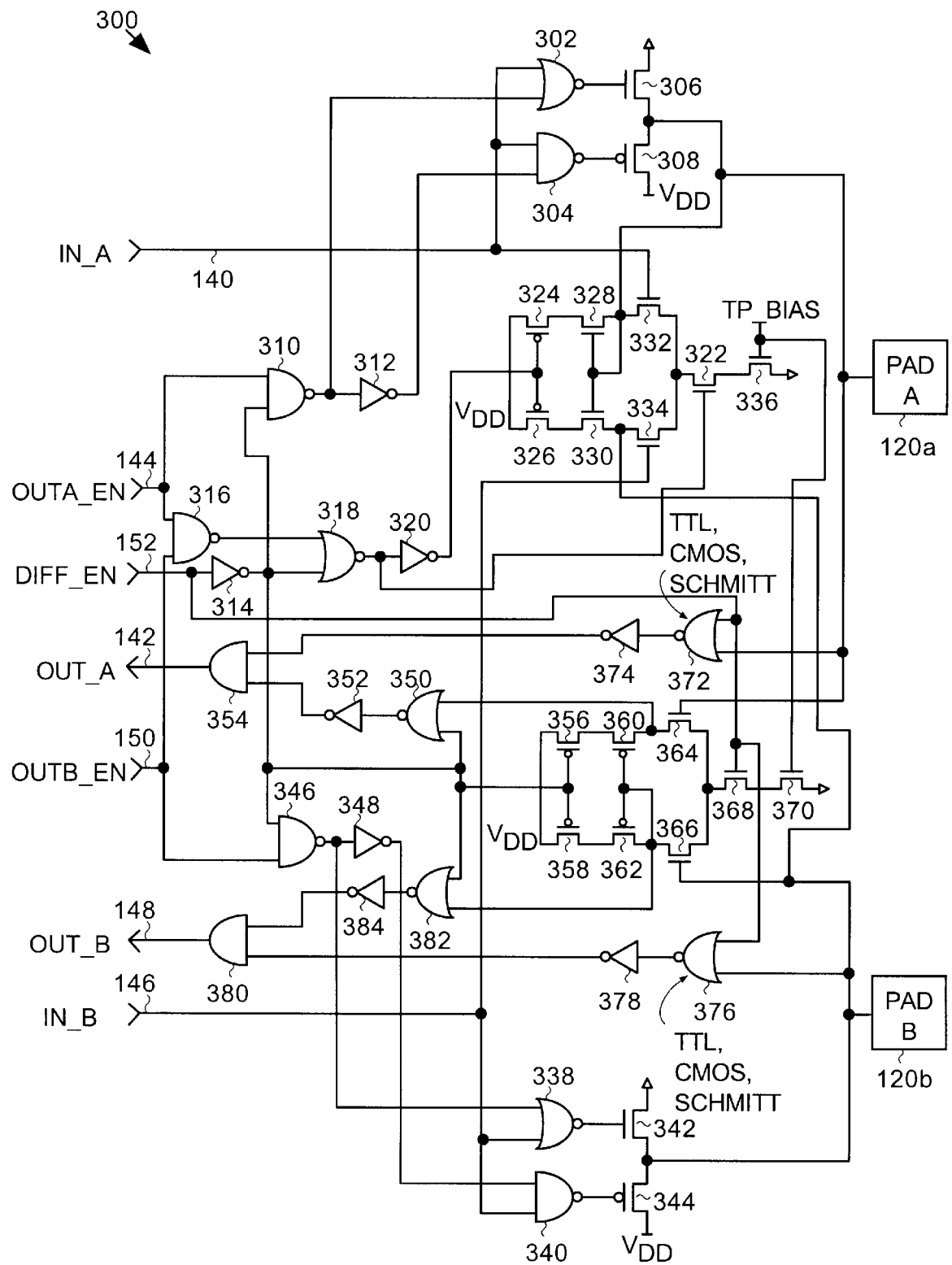
FIG. 4 is a schematic of a dual-purpose I/O circuit as in FIG. 3, in accordance with one embodiment of the present invention.

FIG. 4 is a schematic of a dual-purpose I/O circuit 116, in accordance with one embodiment of the present invention and the block diagram in FIG. 3. So as to not overly complicate this description, schematic in FIG. 4 will be described herein in accordance with the steady state conditions associated with the various operating modes, as defined above. Nonetheless, those skilled in the art will recognize from the schematic and this description that there are additional transient and switching states, and inter-dependencies relating to the components and circuits within dual-purpose I/O circuit 116. Furthermore, those skilled in the art will recognize that additional components can be added to compensate or otherwise modify the circuits functions while in an operating mode or while between operating modes.

To further simplify this description, the various components shown in FIG. 4 will be allocated to the blocks illustrated in FIG. 3. Also, hereinafter, logical low is be defined as "0", and logical high is defined as "1".

Thus, first single-ended output buffer 202 includes NOR gate 302, NAND gate 304 and transistors 306 and 308. NOR gate 302 is "enabled" when it receives a "0" enable signal on its input from the output of NAND gate 310 which compares OUTA_EN with DIFF_EN. Therefore, NOR gate 302 is enabled when OUTA_EN is a "1" and DIFF_EN is a "0". When enabled, NOR gate 302 turns transistor 306 "on" when IN_A is a "0" which causes pad 120a to be a "0", and "off" when IN_A is a "1" which causes pad 120a to be a "1". Similarly, NAND gate 304 is "enabled" when it receives a "1" enable signal on its input from the output of inventor 312 which is connected to the output of NAND gate 310. Therefore, NAND gate 304 is enabled when OUTA_EN is a "1" and DIFF_EN is a "0". When enabled, NAND gate 304 turns transistor 308 "on" when IN_A is a "1"which causes pad 120b to be a "1", and "off" when IN_A is a "0" which causes 120b to be a "0". When NOR gate 302 and NAND gate 304 are "disabled", transistors 306 and 308 will be "off" causing line 309 to float (i.e., tri-state).

Similarly, second single-ended output buffer 204 includes NOR gate 338, NAND gate 340 and transistors 342 and 344. NOR gate 338 is "enabled" when it receives a "0" enable signal on its input from the output of NAND gate 346 which compares OUTA_EN with DIFF_EN. Therefore, NOR gate 338 is enabled when OUTA_EN is a "1" and DIFF_EN is a "0". When enabled, NOR gate 338 turns transistor 342 "on" when IN_B is a "0" which causes pad 120b to be a "0", and "off" when IN_B is a "1" which causes pad 120b to be a "1". Similarly, NAND gate 340 is "enabled" when it receives a "1" enable signal on its input from the output of inverter 348 which is connected to the output of NAND gate 346. Therefore, NAND gate 340 is enabled when OUTA_EN is 1 and DIFF_EN is a "0". When enabled, NAND gate 340 turns transistor 344 "on" when IN_B is a "1"which causes pad 120b to be a "1", and "off" when IN_B is a "0" which causes 120b to be a "0". When NOR gate 338 and NAND gate 340 are "disabled", transistors 342 and 344 will be "off" causing line 345 to float.

First single-ended input buffer 206 includes NOR gate 372, invertor 374, and AND gate 354 (which it shares with differential input buffer 212). NOR gate 372 is preferably a TTL, CMOS, SCHMITT, or other like gate that is triggered by a specific voltage on it's inputs. NOR gate 372 receives DIFF_EN and the I/O signal from pad 120a. When DIFF_EN is a "0", the output of NOR gate 372 is the inverse of the I/O signal on pad 120a. When DIFF_EN is a "1", the output of NOR gate 372 is a "0". The output of NOR gate 372 is applied to the input of inverter 374 which inverts the output from NOR gate 372 and applies it to an input of AND gate 354. AND gate 354 also receives an enable signal from NOR gate 350 by way of invertor 352. Notice that NOR gate 350 outputs a "1" when DIFF_EN is a "0". The output of NOR gate 350 is inverted by invertor 352 and applied to AND gate 354. As a result, when DIFF_EN is a "0" the output of AND gate 354 will mirror the I/O signal on pad 120a.

Similarly, second single-ended input buffer 208 includes NOR gate 376, invertor 378, and AND gate 380 (which it shares with differential input buffer 212). NOR gate 376 is preferably a TTL, CMOS, SCHMITT, or other like gate that is triggered by a specific voltage on it's inputs. NOR gate 376 receives DIFF_EN and the I/O signal from pad 120b. When DIFF_EN is a "0", the output of NOR gate 376 is the inverse of the I/O signal on pad 120b. When DIFF_EN is a "1", the output of NOR gate 376 is a "0". The output of NOR gate 376 is applied to the input of invertor 378 which inverts the output from NOR gate 376 and applies it to an input of AND gate 380. AND gate 380 also receives an enable signal from NOR gate 382 by way of invertor 384. Notice that NOR gate 382 outputs a "1" when DIFF_EN is a "0". The output of NOR gate 382 is inverted by invertor 384 and applied to AND gate 380. As a result, when DIFF_EN is a "0" the output of AND gate 380 will mirror the I/O signal on pad 120b.

Differential output buffer 210 includes transistors 324, 326, 328, 330, 332, 334, 322, and 336. Differential output buffer 210 essentially operates as a standard differential amplifier, wherein transistors 328 and 330 are connected to form a current mirror, transistors 330 and 334 form a matched pair, and transistor 336 is hardwired to the TP_bias voltage to provide the proper reference voltage for the differential output buffer.

Transistors 324 and 326 are arranged to connect and disconnect differential output buffer 210 to and from a voltage $V_{DD}$. The inverting gates of transistors 324 and 326 are connected together and are enabled by a series of logic gates within summer 214. Specifically, transistors 324 and 326 are enabled via NAND gate 316, NOR gate 318, and invertors 314 and 320 in response to OUTA_EN, OUTB_EN and DIFF_EN. OUTA_EN and OUTB_EN are applied to the inputs of NAND gate 316. When both OUTA_EN and OUTB_EN are a "1", NAND gate 316 outputs a "0" to NOR gate 318. NOR gate 318 also receives the inverse of DIFF_EN as output by invertor 314. As such, when OUTA_EN, OUTB_EN and DIFF_EN are each a "1", NOR gate 318 outputs a "1" to the input of invertor 320 which then applies a "0" to the inverting gates of transistors 324 and 326, thereby causing them to turn "on". Notice also that the output from NOR gate 318 is further applied to the gate of transistor 322 whereby transistor 322 will be turned "on" when OUTA_EN, OUTB_EN and DIFF_EN are each a "1". As a result, transistors 324, 326 and 322 "enable" differential output buffer 210 when OUTA_EN, OUTB_EN and DIFF_EN are each a "1", and fully "disable" it when each is a "0".

When differential output buffer 210 is enabled, IN_A is applied to the gate of transistor 332 and IN_B is applied to the gate of transistor 334, transistors 328 and 330 operate to cause a positive differential I/O signal to be applied to pad 120a and a negative differential I/O signal to be applied to pad 120b.

Differential input buffer 212 includes transistors 356, 358, 360, 362, 364, 366, 368, and 370. Differential input buffer 212 essentially operates as a standard differential amplifier, wherein transistors 360 and 362 are connected to form a current mirror, transistors 364 and 366 form a matched pair, and transistor 370 is hardwired to the TP_bias voltage which provides the proper reference voltage for the differential input buffer.

Transistors 356 and 358 are arranged to connect and disconnect differential input buffer 212 to and from a voltage $V_{DD}$. The inverting gates of transistors 356 and 358 are connected together and are enabled by invertor 314 which inverts DIFF_EN. Therefore, when DIFF_EN is a "1", transistors 356 and 358 are turned "on". In addition, DIFF_EN is directly applied to the gate of transistor 368 which is, therefore, turned "on" when DIFF_EN is a "1", and turned "off" when DIFF_EN is a "0". As a result, transistors 356, 358 and 368 "disable" differential input buffer 212 when DIFF_EN is a "0", and "enable" it when DIFF_EN is a "1".

Therefore, when differential input buffer 212 is enabled, and a positive differential I/O signal is applied to pad 120a (from an external source) and a negative differential I/O signal is applied to pad 120b (also from an external source), then these differential I/O signals are applied to the gates of transistors 364 and 366, respectively. In response, transistors 360 and 362 operate to cause a first logical I/O signal proportional to the positive differential I/O signal to be applied to an input to NOR gate 350, and a second logical I/O signal proportional to the negative differential I/O signal to be applied to an input of NOR gate 382.

As a result, when DIFF_EN is a "1", NOR gate 350 inputs a "0" from invertor 314 which allows NOR gate 350 to output the inverse of the first logical I/O signal received from differential input buffer 212 to invertor 352. The output from invertor 352 is applied to AND gate 354, which mirrors the output of invertor 352 when DIFF_EN is a "1". The output of AND gate 354 is applied to line OUT_A 142. Similarly, when DIFF_EN is a "1" NOR gate 382 inputs a "0" from invertor 314 which allows NOR gate 382 to output the inverse of the second logical I/O signal received from differential input buffer 212 to invertor 384. The output from invertor 384 is applied to AND gate 380, which mirrors the output of invertor 384 when DIFF_EN is a "1". The output of AND gate 380 is applied to line OUT_B 148.

Additional features of the implementation of a dual-purpose I/O circuit 116 in FIG. 4 will be apparent to those skilled in the art. To further illustrate the operating modes, table 1 (below) presents the status of the various inputs and outputs to dual-purpose I/O circuit 116 which are controlled therein.

useful to verify proper functioning of the dual-purpose I/O circuit 116 by feeding the signals (or their logical equivalents) on Pads 120a and 120b back to lines OUT_A 142 and OUT_B 148, as is done in the embodiment of the present invention in FIG. 4.

While this invention has been described in terms of several preferred embodiments, there are alterations, permutations, and equivalents which fall within the scope of this invention. It should also be noted that there are may alternative ways of implementing both the process and apparatus of the present invention. It is therefore intended that the following appended claims be interpreted as including all such alterations, permutations, and equivalents as fall within the true spirit and scope of the present invention.

What is claimed is:

1. A dual-purpose I/O circuit for use in an integrated circuit, said dual-purpose I/O cell comprising:
   a first conducting pad;
   a second conducting pad;
   a first single-ended I/O cell coupled to said first conducting pad;
   a second single-ended I/O cell coupled to said second conducting pad;
   a differential I/O cell coupled to said first single-ended and second single-ended I/O cells and said first and second conducting pads; and
   control logic coupled to at least one of said first single-ended, second single-ended and differential I/O cells and arranged to selectively enable and disable said at

TABLE 1

| Operating Mode: | OUTA_EN | OUTB_EN | DIFF_EN | PAD 120a | Pad 120b | OUT_A | OUT_B |
|---|---|---|---|---|---|---|---|
| Single-Ended Input Mode | "0" | "0" | "0" | "Z" | "Z" | =Pad 120a | =Pad 120b |
| Single-Ended Output Mode | "1" | "1" | "0" | =IN_A | =IN_B | "X" | "X" |
| Differential Input Mode | "0" | "0" | "1" | "Z" | "Z" | =Pad 120a | =Pad 120b |
| Differential Output Mode | "1" | "1" | "1" | =IN_A DIFF+ | =IN_A DIFF– | "X" | "X" |

Thus, in:
(1) Single-ended input mode, lines OUT_A 142 and OUT_B 148 are provided with the I/O signals from pads 120a and 120b, respectively, and first and second single-ended output buffers 202 and 204 are in a floating ("Z") or high impedance state;
(2) Differential input mode, OUT_A 142 and OUT_B 148 are provided with the logical equivalent of the differential I/O signals from pads 120a and 120b, and first and second single-ended output buffers 202 and 204 are in a floating ("Z") or high impedance state;
(3) In a single-ended output mode, the I/O signals from lines IN_A 140 and IN_B 146 are applied to pads 120a and 120b, respectively; and
(4) In a differential output mode, the differential equivalents of the I/O signals from lines IN_A 140 and IN_B 146 are applied to pads 120a and 120b.

Notice that in both a single-ended output mode and a differential output mode that an "X" is used to represent that the signals present on lines OUT_A 142 and OUT_B 148 are not considered as controlled outputs. However, those skilled in the art will recognize that there may be some benefit to controlling these signals. For example, it can be least one of said first single-ended, second single-ended and differential I/O cells.

2. The dual-purpose I/O circuit as recited in claim 1 wherein said first single-ended I/O cell is arranged to transfer a first signal between said first conducting pad and at least one of a first-cell input and a first-cell output.

3. The dual-purpose I/O circuit as recited in claim 1 wherein said second single-ended I/O cell is arranged to transfer a second signal between said second conducting pad and at least one of a second-cell input and a second-cell output.

4. The dual-purpose I/O circuit as recited in claim 1 wherein said differential I/O cell is arranged to convert at least one of:
   a first signal as applied to a first-cell input into a first differential signal that is then transferred to said first conducting pad;
   a second signal as applied to a second-cell input into a second differential signal that is then transferred to said second conducting pad;
   the first differential signal as applied to said first conducting pad into said first signal that is then transferred to a first-cell output; and the second differential signal as applied to said second conducting pad into said second signal that is then transferred to a second-cell output.

5. The dual-purpose I/O circuit as recited in claim 1 wherein said control logic outputs one or more control signals that configure said dual-purpose I/O circuit in accordance with an operating mode selected from the group of a single-ended input mode, a single-ended output mode, a differential input mode, and a differential output mode.

6. The dual-purpose I/O circuit as recited in claim 5 wherein said single-ended input mode causes:

said differential cell to be disabled; and at least one of:
said first single-ended I/O cell to be enabled and configured to transfer a first signal from said first conducting pad to a first-cell output, and
said second single-ended I/O cell to be enabled and configured to transfer a second signal from said second conducting pad to a second-cell output.

7. The dual-purpose I/O circuit as recited in claim 5 wherein said single-ended output mode causes:

said differential cell to be disabled; and at least one of:
said first single-ended I/O cell to be enabled and configured to transfer a first signal from a first-cell input to said first conducting pad, and
said second single-ended I/O cell to be enabled and configured to transfer a second signal from a second-cell input to said second conducting pad.

8. The dual-purpose P(O circuit as recited in claim 5 wherein said differential input mode causes:

said first and second single-ended I/O cells to be disabled; and said differential I/O cell to be enabled and configured to convert at least one of:
a first differential signal as applied to said first conducting pad into a first signal that is then transferred to a first-cell output, and
a second differential signal as applied to said second conducting pad into a second signal that is then transferred to a second-cell output.

9. The dual-purpose I/O circuit as recited in claim 5 wherein said differential output mode causes:

said first and second single-ended I/O cells to be disabled; and said differential I/O cell to be enabled and configured to convert at least one of:
a first signal as applied to a first-cell input into a first differential signal that is then transferred to said first conducting pad;
a second signal as applied to a second-cell input into a second differential signal that is then transferred to said second conducting pad.

10. An integrated circuit die comprising:

a primary circuit; and a dual-purpose I/O circuit as recited in claim 1, wherein said dual-purpose I/O circuit is coupled to said primary circuit.

11. The integrated circuit as recited in claim 10 wherein said primary circuit is arranged to supply at least one of:

(a) a first signal to said first single-ended I/O cell; and (b) a second signal to said second single-ended I/O cell.

12. The integrated circuit as recited in claim 10 wherein said primary circuit is arranged to receive at least one of:

(a) a first signal from said first single-ended I/O cell; and (b) a second signal from said second single-ended I/O cell.

13. The integrated circuit as recited in claim 10 wherein said primary circuit is further arranged to supply one or more mode section signals to said control logic, said mode selection signals representing one or more operating modes for said dual-purpose I/O circuit.

14. The integrated circuit as recited in claim 13 wherein said primary circuit comprises:

a LINK circuit; and a PHY circuit, said PHY circuit being coupled between said LINK circuit and said dual-purpose I/O circuit.

15. The integrated circuit as recited in claim 14 wherein said LINK circuit is coupled to at least one of said first and second single-ended, and differential I/O cells.

16. The integrated circuit as recited in claim 14 wherein said PHY circuit is coupled to at least one said first and second single-ended, and differential I/O cells.

17. A method for inputting/outputting I/O signals in an integrated circuit, said method comprising:

providing a primary circuit within said integrated circuit;

providing a dual-purpose I/O circuit within said integrated circuit, said dual-purpose I/O circuit having a first single-ended I/O cell, a second single-ended I/O cell, a differential I/O cell, a first conducting pad, and a second conducting pad;

configuring said dual-purpose I/O cell with one or more control signals by selectively enabling and disabling said first single-ended, second single-ended and differential I/O cells; and causing one or more I/O signals to be transferred between at least one of said first and second conducting pads and said primary circuit via at least one of said first single-ended, second single-ended and differential I/O cells.

18. The method as recited in claim 17 wherein said first single-ended, second single-ended and differential I/O cells only transfer said one or more I/O signals when enabled.

19. The method as recited in claim 17 wherein when said differential I/O cell is enabled said first single-ended and second single-ended cells are disabled and said differential I/O cell converts between one or more normal I/O signals and one or more differential I/O signals.

20. The method as recited in claim 17 wherein said configuring said dual-purpose I/O circuit further comprises setting an operating mode within said dual-purpose I/O cell via said one or more control signals.

21. The method as recited in claim 20 wherein, when said operating mode is a single-ended input mode, said method further comprises:

disabling said differential I/O cell;

enabling said first single-ended I/O cell;

supplying a first normal I/O signal from a first conducting pad to said primary circuit; and enabling said second single-ended I/O cell;

supplying a second normal I/O signal from a second conducting pad to said primary circuit.

22. The method as recited in claim 20 wherein, when said operating mode is a single-ended output mode, said method further comprises:

disabling said differential I/O cell;

enabling said first single-ended I/O cell;

supplying a first normal I/O signal from said primary circuit to a first conducting pad; and enabling said second single-ended I/O cell;

supplying a second normal I/O signal from said primary circuit to said second conducting pad.

23. The method as recited in claim 20 wherein, when said operating mode is a differential input mode, said method further comprises:

disabling said first single-ended and second single-ended I/O cells;

enabling said differential I/O cell;

converting, with said differential I/O cell, at least one of:
a first differential I/O signal as applied to a first conducting pad into
a first normal I/O signal and supplying said first normal I/O signal to said primary circuit, and
a second differential I/O signal as applied to a second conducting pad into a second normal I/O signal and supplying said second normal I/O signal to said primary circuit.

24. The method as recited in claim 20 wherein, when said operating mode is a differential output mode, said method further comprises:

disabling said first single-ended and second single-ended I/O cells;

enabling said differential I/O cell;

converting, with said differential I/O cell, at least one of:
a first normal I/O signal as received from said primary circuit into a first differential I/O signal and supplying said first differential I/O signal to a first conducting pad, and
a second normal I/O signal as received from said primary circuit into a second differential I/O signal and supplying said second differential I/O signal to a second conducting pad.

25. The method as recited in claim 20 further comprising:

generating said one or more control signals with said primary circuit; and supplying said one or more control signals to said dual-purpose I/O circuit.

26. An integrated circuit, comprising:

a circuit die having arranged thereon;
a primary logic circuit area; and
a plurality of I/O cell areas, said plurality of I/O cell areas each having substantially the same width ad length and being arranged outside of said primary logic circuit area, and wherein two of said I/O cell areas are adjacent to one another and include a dual-purpose I/O circuit within the combined areas of said two adjacent I/O cells;
wherein said dual-purpose I/O circuit includes,
a first conducting pad;
a second conducting pad;
a first single-ended I/O cell coupled to said first conducting pad;
a second single-ended I/O cell coupled to said second conducting pad;
a differential I/O cell coupled to said first single-ended and second single-ended I/O cells and said first and second conducting pads; and
control logic coupled to at least one of said first single-ended, second single-ended and differential I/O cells and arranged to selectively enable and disable said at least one of said first single-ended, second single-ended and differential I/O cells.

27. The integrated circuit as recited in claim 26 wherein said plurality of cells are arranged about a periphery of said primary logic area.

28. The integrated circuit as recited in claim 26 further comprising a combined LINK/PHY circuit within said primary logic area, said combined LINK/PHY circuit being coupled to said dual-purpose I/O cell.

29. The integrated circuit as recited in claim 26 wherein said circuit die is an application-specific integrated circuit (ASIC).

* * * * *